United States Patent [19]

Brudermann et al.

[11] Patent Number: 5,330,815
[45] Date of Patent: Jul. 19, 1994

[54] HEAT SHRINKABLE ENVELOPE

[75] Inventors: Uwe Brudermann, Heikendorf; Hans-Juergen Meltsch, Schwerte, both of Fed. Rep. of Germany

[73] Assignee: RXS Schrumpftechnik-Garnituren GmbH, Munich, Fed. Rep. of Germany

[21] Appl. No.: 938,550

[22] Filed: Aug. 28, 1992

Related U.S. Application Data

[63] Continuation of Ser. No. 696,071, May 6, 1991, abandoned, which is a continuation-in-part of Ser. No. 636,202, Dec. 31, 1990, abandoned.

[30] Foreign Application Priority Data

Mar. 8, 1990 [DE] Fed. Rep. of Germany ....... 4007378

[51] Int. Cl.⁵ .................. B32B 1/00; B32B 27/12; B32B 31/26
[52] U.S. Cl. ................ 428/68; 174/DIG. 8; 285/381; 428/34.9; 428/68; 428/74; 428/81; 428/128; 428/137; 428/913
[58] Field of Search ............... 428/913, 34.9, 68, 74, 428/286, 287; 174/DIG. 8; 285/381

[56] References Cited

U.S. PATENT DOCUMENTS 4,952,438 8/1990 Kipfelsberger ............... 428/247

FOREIGN PATENT DOCUMENTS

| 0299439 | 1/1989 | European Pat. Off. . |
| 3704301A1 | 8/1988 | Fed. Rep. of Germany ......... B29C 67/14 |
| 3704301 | 8/1988 | Fed. Rep. of Germany . |
| 3707433 | 9/1988 | Fed. Rep. of Germany . |
| 3737005 | 5/1989 | Fed. Rep. of Germany . |
| 490180 | 6/1970 | Switzerland . |

*Primary Examiner*—James C. Cannon
*Attorney, Agent, or Firm*—Hill, Steadman & Simpson

[57] ABSTRACT

A heat-shrinkable envelope is composed of at least one shrinkable planar layer on which a reinforcing component of fiber-shaped or thread-shaped reinforcing elements is arranged. These reinforcing elements are arranged in unregulated configuration, for example in the form of a fleece, felt or in an irregular fill. Advantageously, a cover layer may be applied so as to sandwich and bond the reinforcing component between the cover layer and the planar layer.

35 Claims, 2 Drawing Sheets

HEAT SHRINKABLE ENVELOPE

CROSS REFERENCE TO RELATED APPLICATION

This is a continuation of application Ser. No. 07/696,071, filed May 6, 1991, now abandoned which is a continuation-in-part of our prior application Ser. No. 636,202, filed Dec. 31, 1990 now abandoned.

BACKGROUND OF THE INVENTION

1. Field of the Invention

The present invention relates to a heat-shrinkable envelope that is composed of at least one shrinkable component in the form of a planar layer, a reinforcing component applied thereon and a cover layer joined to the shrinkable component and the reinforcing component.

2. Description of the Prior Art

A heat-shrinkable article of the type generally set forth above is disclosed in the European application 0 299 439. A reinforcing component is thereby essentially composed of ordered, individual elements that extend in the form of a lattice. The application of the reinforcing elements occur such that the respective planar layers are already present in their cross-linked and stretched condition, so that the reinforcing components are not subjected to any stretching. The reinforcing elements are fashioned such that a shape change corresponding to the shrink of the shrinkable component is possible.

The German published application 37 07 301 discloses a heat-restorable article wherein the reinforcing elements are composed of short fibers (whiskers) of inorganic materials that are distributed in an irregular arrangement in the plastic. The manufacturing process for such an article sequences that a mixture of a thermoplastic synthetic and the fibers is produced, whereupon this mixture is extruded to form a band or tube. This band or tube is subsequently cross-linked, heated to a temperature above the crystal melting point of the synthetic, deformed while heated, and is subsequently cooled in the stretched or, respectively, distorted condition. The short fibers, therefore, are a constituent part of the extrusion mass from the very beginning and, therefore, of the later, shrinkable component. The disadvantage of such an arrangement resides in the fact that threads having a greater length can be introduced only with difficulty and that the extrusion tool must be designed from the very outset such that these additional component parts can be co-extruded. Moreover, there is the risk that the fibers will align in the extrusion direction during the extrusion process. There is also the possibility that the fibers will "bore out" of the surface and, in particular, will penetrate towards the exterior during shrinking. As a consequence of the extrusion process, an orientation of the reinforcing fibers result that can hardly be controlled or is extremely difficult to control. Moreover, the introduction of a larger proportion of fiber material makes the application of extremely-thin outside layers very difficult, whereby it must also be taken into consideration that the extruder worm must co-convey this fiber material. The lengths of the fibers are selected extremely short for this reason and should lie in the range of 0.5–5 mm, this being potentially too short for a particularly good and tea-resistant reinforcing arrangement.

The German published application 37 37 005 discloses a heat-shrinkable article in which threads extending transversely relative to the stretching and shrinking direction and lying parallel to one another are provided, these threads extending over the full length of the heat-shrinkable article (i.e., from one end to the other). Shorter fibers are strewn over this foundation of parallel, individual threads, these shorter fibers being taken from a reservoir and applied in an arbitrary distribution onto the surface of the carrier band provided with the threads. The fibers are composed of cross-linked polymers, i.e. fiber materials that are already cross linked are applied onto the carrier layer. Difficulties are thereby to be of concern under certain circumstances in that the short fiber pieces are applied onto an already-existing ply of continuous parallel threads and the reinforcement insert is lent a somewhat non-uniform structure overall as a result thereof. In the following rolling process, it is also difficult to join the cover layer and the base layer adequately well and reliably with this intrinsically, differently-structured reinforcing insert. With respect to the reinforcing insert, moreover, the manufacturing process occurs in two steps in that the parallel threads are first applied onto a carrier band of, for example, hot-melt adhesive and the delivery of the short fiber elements is subsequently undertaken via a separate scattering and shaking device.

SUMMARY OF THE INVENTION

The object of the present invention is to provide a heat-shrinkable envelope of the type generally set forth above such that the manufacture thereof can be implemented in a simple manner as such that the article exhibits good shrink and reinforcement properties.

The above object is achieved, according to the present invention, in that a fiber material in an unordered configuration is applied onto the planar layer as a reinforcing component and in that a firm connection is produced between the reinforcing component, the planar layer and the cover layer.

Another object of the invention is to provide a method by which an envelope of the type set forth above can be manufactured in a simple manner.

This object is achieved in that the reinforcing component is applied onto an unstretched planar layer, in that the planar layer and the reinforcing component are covered with a cover layer and are joined to form a uniform, planar structure, and in that the planar structure is heated, stretched and cooled in the stretched condition.

The heat-shrinkable envelope constructed in accordance with the present invention then has advantages over those heretofore known in the art, whereby the strength that is achieved vis-a-vis external stresses is achieved with a reinforcing component that is relatively simple to manufacture in union with a shrinkable matrix. This may be seen both in the structure of the heat-shrinkable envelope itself as well as in the simple and continuously-sequencing method for the manufacture thereof.

The basic concept of the present invention for forming such a heat-shrinkable envelope is essentially that the reinforcing effect is founded on transitions between materials having different mechanical strengths in the possible tearing direction of the article. An ordered structure is respectively encountered in previous models, whereby it is difficult to achieve a mobility of relatively long reinforcing elements required for shrinking. In practicing the present invention, however, the regularity in the arrangement of the relatively-long reinforcing elements is avoided and the aim is an isotropy for the arrangement of the individual reinforcing elements in the form of fibers or threads. An isotropic arrangement of the fibers or threads in planes parallel to the planar layer is essentially present in an article constructed in accordance with the present invention; by contrast, the fibers or threads should optimally not extend roughly perpendicular to this planar layer or at least only a small part thereof should extend roughly perpendicular thereto. This can occur in a simple manner in that the fibers or threads having an appropriate length that preferably corresponds to 3–50 times the value of the thickness of the reinforcing component are employed. It is thereby also expedient that the position of the reinforcing elements is and remains optimally isotropic before, as well as after, the stretching. The individual reinforcing elements according to the present invention can therefore be advantageously shaped in common as a fleece or as felt or can also be correspondingly loosely scattered or, respectively, placed onto the planar layer in an unordered fashion in a special charging process. The placement or, respectively, scattering in the disorder thereof, however, can also occur per se in an intentionally uniform all-around distribution. Given such arrangements of the individual thread-shaped or fiber-shaped reinforcing elements to form a reinforcing component, the requirements with respect to isotropy are satisfied to the farthest-possible degree and a certain disturbance is of no consequence even in the stretching or, respectively, shrinking since the individual reinforcing elements again lie in arbitrary directions before as well as after the motion events, but preferably have their longitudinal axes extending essentially parallel to the planar layer.

An interaction with the planar layer serving as a carrier material, the density of the structural format and the material properties of the reinforcing elements determine the strength and the resistance to the formation of pairs as a consequence of mechanical loads. The envelope constructed in accordance with the present invention thereby exhibits the advantage that this fashioning of the reinforcing component in the form of a fleece, felt or of "unordered fill" allows an arbitrary, freely-selectable combination with respect to the material selection and the fineness of the structure, as well as the uniformity of all properties. It must thereby be guaranteed that the reinforcing components effect or, respectively, at least allow the stretching process and the shrinking process under certain circumstances without the strength of the union thereby being undone. This, for example, is not possible given planar inserts as well as given fabrics or weaves. Moreover, the required resistance to the formation of cracks therein is usually only established in one direction.

In an envelope constructed in accordance with the present invention, at least one of the covering layers, the planar layer and/or the cover layer has shrinking properties. The shrink process is effected as a result thereof, whereby the reinforcing component at least passively co-executes the form changes or even promotes the same when the individual reinforcing elements likewise have shrink properties.

The present invention is also particularly distinguished in that the manufacturing method is extremely simple because it can be implemented in a continuous manner. The fashioning of the reinforcing component as fleece or felt is thereby particularly beneficial, so that it can then also be introduced into the manufacturing process in an independent preform. The details regarding the possible method steps shall be set forth below with reference to the drawings.

Given the optimally isotropic reinforcing component of the present invention, care must be exercised to see that a preamble or, respectively, open-pore structure is preserved given the fleece-like or felt-like structure or even given the "loose fill" of the individual reinforcing elements so that an optimally-good union between the individual layers can be achieved. This occurs during the course of the manufacturing process, for example, by fusing, gluing or mutual interpenetration of materials, within the "porous" reinforcing component above all.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
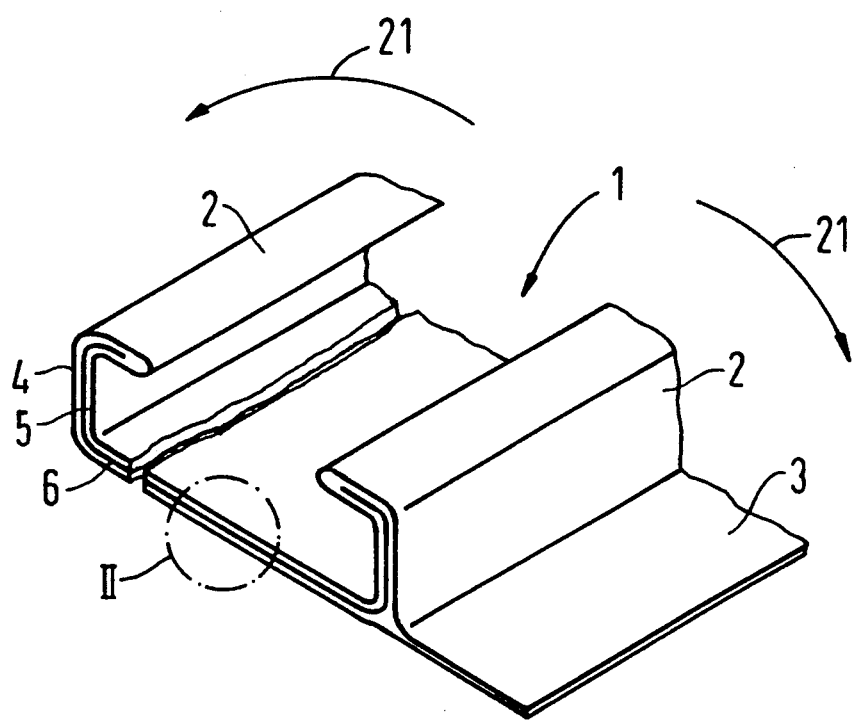
FIG. 1 is a perspective view of an exemplary embodiment for a sleeve that is constructed as a collar and has a structure in accordance with the present invention.
Figure 2:
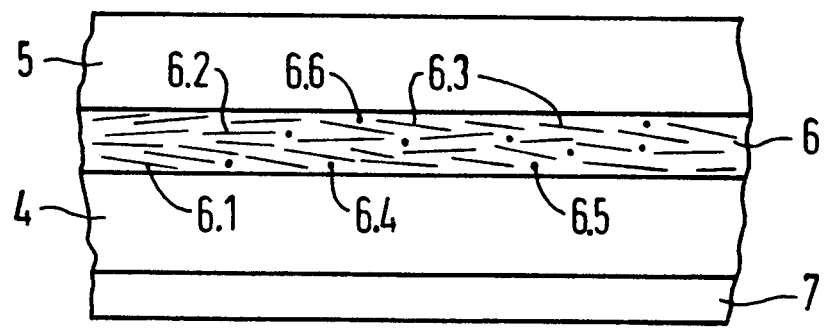
FIG. 2 is a cross-sectional view from which the layer structure of the sleeve of the present invention proceeds.

Referring to FIG. 1, a sleeve is illustrated in the form of a collar 1 of the type usually employed for wrapping articles, for example cables, splices or the like. The size of the illustrated collar 1 is respectively dependent on the diameters of the article to be wrapped; this being the reason why the actual envelope part is shown here in an interrupted manner. L-shaped closure elements 2 are applied to both ends of the envelope part such that, after being wrapped around the article to be enveloped in the direction of the two arrows 21, they have their perpendicularly-projecting seal surfaces lying opposite one another. During mounting, a corresponding closure rail is slipped over the T-shape of the two closure elements 2 that therefore arises. The continuation 3 thereby serves as an inner flap and covers the longitudinal slot in the inside of the collar. It is also indicated in FIG. 1 that the collar 1 constructed in accordance with the present invention is composed of two thin layers 4 and 5 between which a reinforcing component 6 is embedded. Of these thin layers 4 and 5, at least one is fashioned as a shrinkable matrix and is composed of a planar layer of a known shrink compound, for example on the basis of polyethylene or polyolefines or polypropylene. The reinforcing component 6 lying therebetween is composed of fiber material, whereby the fibers or threads are contained in an unordered configuration. A firm union with one another exists between the individual layers. FIG. 2 illustrates an enlarged cross-sectional view through the layer structure of the heat-shrinkable envelope constructed in accordance with the present invention. It becomes clear therefrom that the reinforcing component 6 in this case is arranged between the planar layer 4 and the cover layer 5. The reinforcing component 6 is composed of fiber material, whereby the fiber material is formed of fiber-like or thread-like sections that are united in an unordered configuration. These individual reinforcing elements can therefore be loosely scattered or placed onto the structure 1 during the manufacturing process. A further possibility for manufacturing a reinforcing component 6 in accordance with the present invention is that the individual fiber-like or thread-like sections are formed into a fleece or felt, so that an interconnect, planar reinforcing component results. The individual reinforcing elements can be of different lengths and have an arbitrary cross section.* Above all, however, the reinforcing component should have an open-pore structure so that it can be reliably fixed between the planar layer and the cover layer in the manufacturing process. At least one of these layers, either the planar layer 4 or the cover layer 5, is thereby a heat-shrinkable layer. Both layers, however, can be comprised of heat-shrinkable material. The planar layer 4 is thereby still unstretched before the application of the reinforcing component. During the course of the manufacturing process, the layer combination is also provided with an additional adhesive layer 7, whereby a permeatation barrier can be arranged therein or on one of its surfaces.

(for example a circular polygouse, generally flat rectangular or a changing cross section).

It is also shown in FIG. 2 that the individual threads or fibers 6.1, 6.2 and 6.3 of the reinforcing component 6 (these lying roughly in the plane of the drawing) have their longitudinal direction extending essentially roughly parallel to the planar layer 4. In order to produce a type of "network", of course, there are also fibers or threads 6.4, 6.5 and 6.6 in addition that extend roughly perpendicular or obliquely relative to the plane of the drawing whose longitudinal axes, however, likewise lie roughly parallel to the planar layer 4. It must also be taken into consideration that the threads or fibers 6.1–6.6 are significantly longer than the thickness of the reinforcing component 6, preferably 3–50 times longer. The mentioned "parallelism" of the longitudinal axes of the fibers or threads relative to the planar layer 4 is already guaranteed on the basis of the dimensions in this manner.

In the ultimate condition (not shown here), the interspaces of the initially "open-pore" reinforcing component 6 are filled with material of the planar layer 4 and/or of the cover layer 5 or with an adhesive, so that these layers together yield a reinforced laminate structure. The surface layer 4 as well as the cover layer 5 are composed of plastic material, preferably of known shrink compounds on the basis of polyethylene or, respectively, polyolefine. The individual reinforcing elements of the reinforcing component 6 can be composed of an arbitrary material, but plastic material, preferably polyethylene or polyolefine in cross-linked or noncross-linked form is preferably employed. The fibers of the reinforcement elements comprise for example polyester, polyacrylate or aramid. As is already evident from FIG. 1, the reinforcing component 6 is also introduced into the closure elements 2, so that these are also reinforced. When additional longitudinal rod (not shown) or the like are provided in the region of the closure elements 2, then the reinforcing components (potentially together with the planar layer and the cover layer) in the form of a fleece or felt layer can be wrapped about these longitudinal rods and thereby yield a particularly good tensile arrangement.

Figure 3:
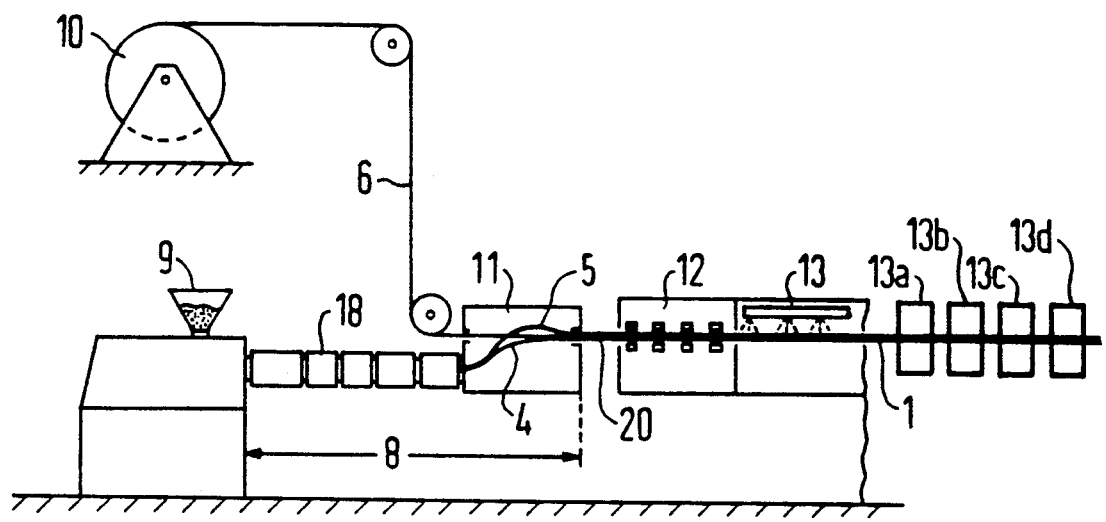
FIG. 3 is a schematic illustration of a first manufacturing method for forming the cable sleeve of the present invention in which a planar structure in the form of a fleece or felt is employed as a reinforcing component.

FIG. 3 illustrates a first method for manufacturing a heat-shrinkable envelope constructed in accordance with the present invention. A reinforcing component 6 in the form of a fleece or a felt that is already planarly fashioned is employed here. This reinforcing component 6 is composed of individual fibers or threads of an arbitrary length, preferably the length already set forth, that are united in an unordered, i.e. in an isotropic configuration, such that an initially-independent planar structure is present that, for example, can be wound onto a pay-off drum 10. This planar structure has an open-pore and self-bearing structure and, for example, can already be co-introduced in the co-extrusion of the planar layer 4 and the cover layer 5 of shrink compound in an extruder 11. In this case, it is indicated that the planar layer 4 and the cover layer 5 are composed of the same base material 9 that is supplied to the extruder 11 via a barrel extruder 18. This, however, is not compulsory; the cover layer 5 could also be applied in a later method step. Some other (non-shrinkable), compatible plastic material could also be fundamentally employed for this purpose. In the illustrated method, the finished, uniform, planar structure having the layer format illustrated in FIG. 2 is shown exiting the extruder line 8 when the coating with adhesive was simultaneously undertaken. A calibration is provided at 12 and cooling to room temperature in a cooling zone 13 subsequently occurs. In this proposal, the cross linking then subsequently occurs in the cross-linking line and the deformation or, respectively, stretching (not shown) required for impressing the shape memory follows. The cooling of the planar, dilatated structure, finally, is undertaken in this stretched condition so that the shape memory is "frozen in". It is advantageous in this method that the union of all layers already occurs in the extrusion, so that, due to the open-pore structure of the reinforcing component 6, a mutual interpenetration of the (still hot) planar layer 4 and cover layer 5 through the reinforcing component 6 leads to an intimate union of all layers. The manufacturing process is particularly simple and reliable. Due to the open-pore and loose arrangement of the individual reinforcing elements within the reinforcing component 6 constructed as a felt or fleece, the dilatation or, respectively, stretching of the planar layer 4 and the cover layer 5 can occur in common with the reinforcing component since a corresponding motion of the individual reinforcing elements within the structure is possible. Furthermore, in this manufacturing method, the reinforcing element 6 is cross linked together with the two other layers in a single process, insofar as the threads or fibers of the fleece or felt material 6 are composed of cross-linkable material.

Figure 4:
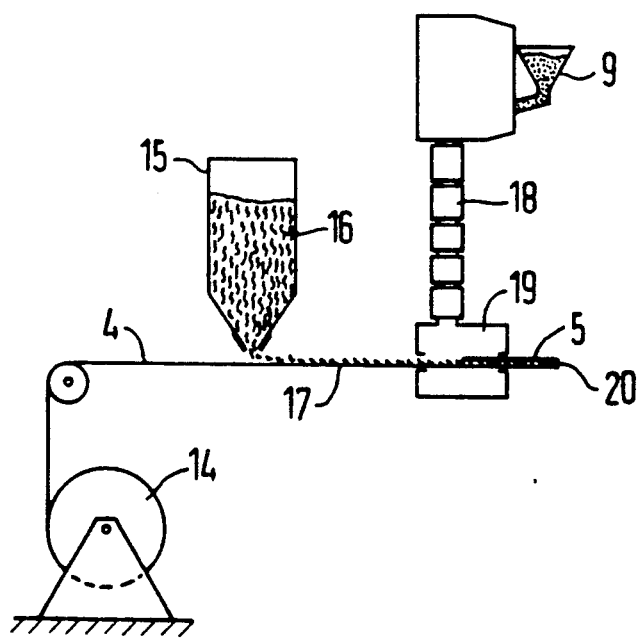
FIG. 4 is a schematic representation of a second method for manufacturing a sleeve in accordance with the present invention, whereby loose fibers or, respectively, threads are introduced into the later union of the sleeve as a reinforcing component.

FIG. 4 illustrates a further modification of the manufacturing method of the present invention. This method proceeds on the basis of a planar layer 4 that is already extruded and that is wound onto a pay-off drum 14 as a correspondingly-wide band. The planar layer 4 is now drawn off and fed under a delivery mechanism 15 for reinforcing elements. As in the method set forth, a reinforcing component formed to a fleece or felt (coming off a drum 10 as in FIG. 3) could be applied here. In the illustrated case, by contrast, the individual fiber-shaped or thread-shaped reinforcing elements 16 that are preferably of noncross-linked plastic material are scattered on or placed on in an unordered configuration, so that a half-finished goods 17 composed of the planar layer 4 and of the reinforcing elements 16 then results, whereby the reinforcing elements 16 are fixed either immediately or in a following extruder 19. As is also the case given the fleece-like or felt-like configurations mentioned above in accordance with the invention, the longitudinal axes of the fiber-shaped or thread-shaped reinforcing elements thereby preferably extend in a direction roughly parallel to the planar layer, i.e. they essentially flat on the planar layer 4. This inherently unordered configuration, however, can also be designed with a defined privileged direction (for an increased tensile strength in a specific direction), whereby the arrangement of the individual reinforcing elements relative to one another remains unordered. The individual reinforcing elements 16 can differ from one another in terms of shape, length, cross section, material and the like, so that the configuration most beneficial for the respective application can be selected from a multitude of possible constellations.

The half-finished goods 17 is now supplied to an extruder head 19 of an extruder 18 that contains a plastic material 9 for the cover layer. The half-finished goods 17 is now provided with the cover layer in the extrusion process, so that the uniformly-planar structure 20 is obtained at the end of the extrusion appliance, the structure 20 being completed in further, above-described method steps such as cross linking, dilatation, cooling, etc, to form the shrinkable envelope.

Instead of extruding the cover layer, however, the delivery of a finished cover layer is also possible, this being applied with firm adhesion onto the half-finished goods 17 in a suitable apparatus, so that the uniform, planar structure that is to be further processed is then likewise present as a whole. During the course of the further method steps, the planar structure 20 in dilatated or undilatated form is additionally provided with an adhesive layer and may also be provided with a permeation barrier. The adhesive layer is preferably composed of a known hot-melt glue and, for example, an aluminum foil, preferably likewise having a glue coating, can be applied as a permeation barrier.

The above two examples of the method indicate that a multitude of possibilities for manufacturing a shrinkable envelope under the prerequisite of the fashionings of the present invention are possible, whereby this is predominantly based on the fact that the reinforcing effect of the reinforcing component in accordance with the present invention is included therein such that transitions between materials having different mechanical strengths are present in the possible tear direction. This reinforcing component is respectively brought into an intimate union with an actively shrinking plastic compound of inherently known types, whereby a nearly unimpeded dilatation or, respectively, stretching, as well as a later shrinking of the finished envelope, are nonetheless possible as a consequence of the isotropic configuration of the reinforcing component, whereby the reinforcing properties are preserved. The reinforcing component can be formed of stretchable or of stretchable and shrinkable elements and shrinkable as well as non-stretchable individual reinforcing elements, whereby a free mobility must always be guaranteed, this being the case given simple scattering or given formation of a fleece or felt. A plurality of reinforcing components can also definitely be arranged on top of one another, whereby each of the reinforcing components may be provided with a cover layer. The cover layers are either applied onto the respective reinforcing component or the inverse procedure is also possible. The reinforcing component can likewise also be embedded between two cover layers. The cohesion between the individual layers, the cover layers, as well as between the planar layers and the reinforcing components occurs by fusing, gluing or interpenetration of material, so that the reinforcing component lies respectively at, on or between the layers. It is also possible to embed the reinforcing component between cover layers and to only then apply it onto the planar layer, whereby the latter is then preferably constructed as a shrinkable component.

The goal of the present invention is an isotropy of the reinforcing component as is established, for example, given a fleece or a felt-like structure or given free scattering, whereby the reinforcing component is respectively bonded in a matrix of actively shrinking plastic material. Noncross-linked polymers such as, for example, high-weight, high-density polyethylene (HWHDPE) or acrylonitrile-butadiene-styrene-terpolymer (ABS) are particularly suitable as the material for the individual reinforcing elements. Given utilization of such reinforcing elements, the cross linking then occurs later during the cross linking of the planar structure that has already been assembled.

As reinforcing elements, individual threads or fibers can already be twined or twisted together before the manufacture of the reinforcing component.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

The heat-shrinkable envelope can also comprise a reinforcing component with a plurality of fibers, whereby a first portion of said plurality of fibers is disposed in an isotropic arrangement and a second portion of said plurality of fibers is disposed in an ordered arrangement.

The heat-shrinkable envelope can further comprise reinforcement elements, which can consist of stretchable material as for example metal, especially as copper. But it is also possible to use a non-stretchable material as for example glass-fibers.

We claim:

1. In a heat-shrinkable envelope having at least one stretchable and shrinkable component in the form of a planar layer, a reinforcing component and a cover layer joined to the shrinkable component with the reinforcing component therebetween, the improvement comprising:

said reinforcing component comprising a randomly disposed open-pore arrangement of fibers, the longitudinal axes of which are in planes essentially parallel to said planar layer, said arrangement being one which imparts isotropic characteristics of stretchability and heat-shrinkability to said reinforcing component, and said parallel arrangement being a characteristic of the envelope in the heat-shrunk state;

said fibers of said reinforcing component disposed in arbitrary directions before and after motion events caused by stretching and shrinking of said shrinkable component and having longitudinal axes extending substantially parallel to said planar layer; and fixing means for bonding the fibers of said reinforcing component to said shrinkable component and to said cover layer before stretching of said shrinkable component and for causing said fibers to remain bonded to said shrinkable component and to said cover layer as said shrinkable component shrinks.

2. The improved heat-shrinkable envelope of claim 1, wherein:
said reinforcing component is constructed as a felt.

3. The improved heat-shrinkable envelope of claim 1, wherein:
said reinforcing component is constructed as a fleece.

4. The improved heat-shrinkable envelope of claim 1, wherein:
said reinforcing component comprises a loose fill applied onto the planar layer.

5. The improved heat-shrinkable envelope of claim 1, wherein:
at least one of the planar and cover layers comprises a planar matrix of shrinkable material.

6. The improved heat-shrinkable envelope of claim 5, wherein:
the shrinkable material is polyolefine.

7. The improved heat-shrinkable envelope of claim 5, wherein:
the shrinkable material is polypropylene.

8. The improved heat-shrinkable envelope of claim 1, wherein:
said reinforcing component comprises a noncrosslinked polymer.

9. The heat-shrinkable envelope of claim 8, wherein:
said polymer is a high-weight, high-density polyethylene.

10. The improved heat-shrinkable envelope of claim 8, wherein:
said polymer is an acrylonitrile-butadiene-styrene terpolymer.

11. The heat-shrinkable envelope of claim 1, wherein:
said heat-shrinkable envelope is in the form of a band including a pair of spaced marginal edge portions as closure elements; and
said reinforcing component extends within said planar and cover layers into said marginal edge portions.

12. The heat-shrinkable envelope of claim 1, wherein:
said reinforcing component comprises reinforcing elements disposed in arbitrary directions, said reinforcement elements comprising a fiber-like elements each having a length at least as great as the thickness of the reinforcing component.

13. The heat-shrinkable envelope of claim 1, wherein:
said reinforcing component comprises reinforcing elements disposed in an isotropic arrangement, said reinforcing elements comprising fiber-like elements each having a length of 3–50 times the thickness of the reinforcing component.

14. The improved heat-shrinkable envelope of claim 1, wherein:
each of said fibers comprises a circular cross section.

15. The improved heat-shrinkable envelope of claim 1, wherein:
each of said fibers comprises a polygonal cross section.

16. the improved heat-shrinkable envelope of claim 1, wherein:
each of said fibers comprises a generally flat rectangular cross section.

17. The improved heat-shrinkable envelope of claim 1, wherein:
each of said fibers comprises a changing cross section.

18. The improved heat-shrinkable envelope of claim 1, wherein:
said reinforcing component comprises a plurality of fibers, a first portion of said plurality of fibers disposed in arbitrary directions and a second portion of said plurality of fibers disposed in an ordered arrangement.

19. The improved heat-shrinkable envelope of claim 12, wherein:
said reinforcing elements comprise stretchable material.

20. The improved heat-shrinkable envelope of claim 12, wherein:
said reinforcing elements comprise stretchable material including metal.

21. The improved heat-shrinkable envelope of claim 12, wherein:
said reinforcing elements comprise stretchable material including copper.

22. The improved heat-shrinkable envelope of claim 12, wherein:
said reinforcing elements comprise stretchable material including plastic material.

23. The improved heat-shrinkable envelope of claim 12, wherein:
said reinforcing elements comprise a stretchable and shrinkable material.

24. The improved heat-shrinkable envelope of claim 12, wherein:
said reinforcing elements comprise a stretchable and shrinkable plastic material.

25. The improved heat-shrinkable envelope of claim 12, wherein:
said reinforcing elements comprise a stretchable and shrinkable polyolefine material.

26. The improved heat-shrinkable envelope of claim 12, wherein:
said reinforcing elements comprise a stretchable and shrinkable polyethylene material.

27. The improved heat-shrinkable envelope of claim 12, wherein:
said reinforcing elements comprise a non-stretchable material.

28. The improved heat-shrinkable envelope of claim 12, wherein:
said reinforcing elements comprise glass fibers.

29. The improved heat-shrinkable envelope of claim 1, wherein:
a plurality of said reinforcing components are layered and said fixing means includes bonded portions of said plurality of reinforcing components, portions of said planar layer and portions of said cover layer.

30. The improved heat-shrinkable envelope of claim 29, wherein:
said plurality of planar layers is provided; and
each of said reinforcing components is carried on a respective one of said planar layers.

31. The improved heat-shrinkable envelope of claim 1, wherein:
said fixing means comprises fused portions of said planar layer, of said reinforcement component and of said cover layer.

32. The improved heat-shrinkable envelope of claim 1, wherein:
said fixing means comprises glue bonding said planar layer, said reinforcement component and said cover layer together.

33. The improved heat-shrinkable envelope of claim 1, wherein:
said fixing means comprises bonding material interpenetration of the material of said reinforcing component and said planar layer and said cover layer.

34. The improved heat-shrinkable envelope of claim 1, wherein:
said fibers are individual fibers which are entwined with one another.

35. The improved heat-shrinkable envelope of claim 1, wherein:
said fibers are individual fibers which are twisted with one another.

* * * * *